April 25, 1961
E. SATTLER
2,981,766
PROCESS FOR PURIFYING CRUDE BENZENE
Filed April 22, 1957
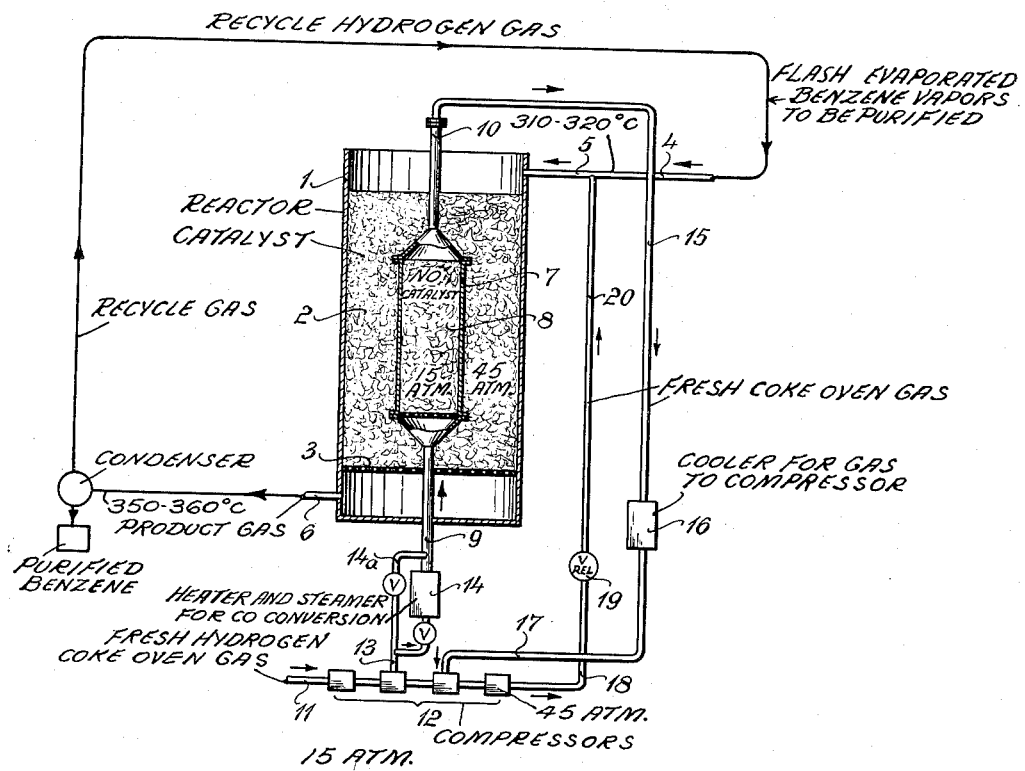
INVENTOR United States Patent Office 2,981,766
Patented Apr. 25, 1961

2,981,766

PROCESS FOR PURIFYING CRUDE BENZENE

Emil Sattler, Essen, Germany, assignor, by mesne assignments, to Koppers Company, Inc., Pittsburgh, Pa., a corporation of Delaware Filed Apr. 22, 1957, Ser. No. 654,267

2 Claims. (Cl. 260—674)

The present invention relates to an improved arrangement for purifying crude benzene by the known process of catalytic pressure refining the initial material in the vapour phase at elevated pressure and temperature and in the presence of catalyst with a recycle gas containing hydrogen.

With known process as described in U.S. Patent No. 2,910,517, dated October 27, 1959, filed December 5, 1956 by this inventor Sattler and Willi Oettinger, and referred to hereinafter, of pressure-refining of crude benzene, when the fresh hydrogen gas, which is constantly supplied for replacing the hydrogen consumed during the refining operation, consists of coke-oven gas or town gas, special measures are necessary in order to prevent an undesirable consumption of hydrogen from taking place due to the carbon monoxide contained in the fresh gas being partially converted with the hydrogen into methane. Consequently, it has been proposed in my aforesaid joint invention Patent No. 2,910,517, based on application Serial No. 626,424 filed December 5, 1956 that the fresh gas that is to be introduced into the process as replacement for the hydrogen consumed should be introduced into the catalytic treatment stage (reactor) in such manner that it initially enters a zone of the reactor where an increased carbon monoxide and steam concentration is present, in which zone the carbon monoxide of the fresh gas containing carbon monoxide and saturated with steam which has been heated in the cylinder by heat absorption from the recycle gas is preferentially converted into hydrogen and carbon dioxide rather than methane. It is only then that the fresh gas treated in this manner is to be combined with the remainder of the recycle gas. With the conversion of the carbon monoxide content of the fresh gas within the special initial zone of the reactor, there is simultaneously obtained a reduction of the sulphurous and nitrogenous compounds of the fresh gas. More especially, the nitric oxide contained in the fresh gas is reduced to nitrogen or ammonia.

According to one particular form of said invention, the initial zone of increased concentration of carbon monoxide and steam consists of a chamber in the form of a conduit disposed as a vertical cylinder axially within the reactor and separated therefrom, which chamber is surrounded externally by the catalyst of the reactor and into which the fresh gas is introduced, this gas consequently being subjected to indirect heat exchange with the hot recycle gas externally of the cylinder. The fresh gas and recycle gas are only combined after the fresh gas has left the cylinder chamber.

The last-described form of the said invention presupposes that the fresh gas, when it is introduced into the cylinder chamber within the reactor, has previously been brought to the same pressure as that which obtains in the other parts of the reactor, namely, to the working pressure of the refining process in the reactor. Experience on the part of the applicants in adapting and perfecting said process with coke oven gas as the fresh gas, has shown that a difficulty does however arise in that coke-oven gas, because it contains nitric oxide as well as hydrogen sulphide, cannot readily be brought to the reactor working pressure of about 40–50 atm. Actually, if the pressure of a gas containing hydrogen sulphide and nitric oxide exceeds the value of about 15 atm. at the most, resinous bodies are formed by a reaction between the hydrogen sulphide and the nitric oxide, these bodies clogging the compressor and connected pressure pipes and equipment. According to an invention of the applicants which has not yet been published, this difficulty can be avoided if the coke-oven gas is compressed in a multi-stage compressor initially only to a pressure of 15 atm. at a maximum and the gas is then largely desulphurised under pressure and thereafter the desulphurised gas is brought in the following stages of the compressor to the necessary working pressure for the refining operation. Thus while it has in fact been shown that if hydrogen sulphide is removed to a sufficient degree at 15 atm., the residual nitric oxides do not show any tendency to form resinous bodies, even at greatly increased pressure with this invention, which has not yet been published, it is nevertheless necessary to have a separate device for extracting the sulphur from the gas brought to a predetermined partial pressure.

The present invention obviates this separate sulphur-purification plant, in that it so modifies the arrangement of the main invention that this arrangement can also be used for a fresh gas from which sulphur has not previously been removed before the gas is raised to working pressure for the refining operation.

The present improvement resides in continuing the invention of the aforesaid cylinder within the reactor but in a form which is operable under a lower pressure from the working pressure in the reactor and supplying the fresh gas to the cylinder chamber at a pressure which is below the working pressure of the reactor, preferably at a pressure of 10–15 atm., and thereafter bringing the fresh gas to the maximum working pressure for the reactor and only then combining the fresh gas with the recycle gas before or with the passage thereof through the reaction chamber.

One diagrammatic arrangement according to the invention is shown in the figure of the drawing, in which however only the reactor proper, i.e. the chamber in which is carried out the conversion of the initial crude benzene with the hydrogen-containing gas and with hydrogenation of the impurities, is shown in section. The reactor 1 is advantageously constructed in the form of a vertical cylindrical vessel, which is filled with a known suitable catalyst mass 2 for hydrogenation of the impurities, and which is supported at the bottom on a grate 3. The recycle hydrogen gas charged with benzene vapours to be purified is conducted into the reactor 1 by way of pipes 4 and 5 from a vaporiser device for crude benzene (which device is not shown herein) and also a heater device connected thereto, the said gas leaving the reactor again through the discharge pipe 6. The required hydrogenation reactions then take place inside the reactor, the initial temperature of the mixture of benzene vapour and hydrogen introduced through the pipe 5 being raised from 310–320° to about 350–360°. From the mixture of vapours withdrawn through the pipe 6, there is then obtained by cooling a condensation of the refined benzene, while the gas which has not condensed is supplied again through the pipe 4 to the reactor after the said gas has become charged with fresh benzene vapors. Provided inside the reactor and preferably axially thereof is a cylinder, the chamber 7 of which is also filled with a known catalyst mass for reduction of sulfurous and nitrogenous compounds. This chamber 7 is provided with a gas supply pipe 9 and a discharge pipe 10, through which the fresh gas can be introduced into the chamber 7 and withdrawn from the said chamber, respectively. The fresh gas, for example coke-oven gas, which contains carbon monoxide, sulphur compounds and nitric oxide as well as hydrogen, is fed through a pipe 11 into the multi-stage compressor 12, in which it is brought to the necessary lower working pressure of 15 atm. Following the early stage of the compressor in which the fresh gas reaches or substantially reaches a pressure of 15 atm. the said gas is withdrawn from the compressor through a pipe 13 and introduced into a device 14, in which the initially compressed gas is heated and charged with steam. Thereafter, the gas passes through the pipe 9 into the chamber 7. By absorption of heat from the reactor 1 while the steam laden fresh coke oven gas is at a pressure of 10–15 atm., reduction of the nitric oxides therein also take place in the chamber 7 by means of a suitably chosen known catalyst 8 for reduction of nitrogen oxides, in addition to the conversion with steam of the carbon monoxide to hydrogen and carbon dioxide, so that the fresh gas no longer contains one of the two resin-forming constituents, namely, the nitric oxides. The fresh gas treated in this manner leaves the chamber 7 through the pipe 10, then passes through a pipe 15, if necessary into an intermediate cooler 16, in which the gas is cooled to a temperature suitable for the following compressor stage. The gas then passes through a pipe 17 into the next-following compressor stage and is then brought to the working pressure (about 45 atm.) which is required for the pressure-refining proper. A danger of resin formation inside the compressor or the pipes on the output side no longer exists, since the hydrogen sulphide still present in the gas has no opportunity of forming resins with nitric oxides. The gas compressed to the full working pressure then passes through a pipe 18 and by way of the regulating valve 19 and the pipe 20 into the pipe 5, where it is combined with the mixture of benzene vapour and recycle gas. If necessary, the fresh gas at working pressure can also be conducted beforehand through a heat-exchanger or other heating means, jointly with or separate from the recycle gas, in order to reach a temperature which is the same as or substantially the same as the temperature of the mixture of benzene vapour and recycle gas.

In the constructional form illustrated, the fresh gas inside the conduit-like chamber 7 has a direction of flow opposite to the recycle gas in the reactor. However, if desired for operational reasons, it is also possible for the fresh gas to be introduced at the top of the chamber 7 and for the recycle gas also to be introduced at the top or even at the bottom, so that the fresh gas and recycle gas flow opposite to one another or in the same direction as one another in both chambers, i.e. both in the reactor 1 and the chamber 7.

Within the scope of the present invention, the conduit-like chamber 7 has for its main object to break down the nitric oxides contained in the fresh gas. In addition, a conversion of carbon monoxide with steam to carbon dioxide and hydrogen by the known water gas shift reaction also takes place, if such is contained in the fresh gas. If conversion of carbon monoxide to carbon dioxide does not take place, either because the fresh gas only contains a small quantity thereof or because a conversion to an appreciable degree is not desired for operational reasons or is not desired at all, the fresh gas does not have to be conducted through the device 14. In this case, the fresh gas is conducted through the pipe 14a to by-pass the device 14.

I claim:

1. In a process for purifying crude benzene contaminated with nitrogenous and sulfur compounds, which comprises: treating initial benzene material aforesaid in the vapor phase in a hydrogenation catalyst reactor at an elevated pressure of 40–50 atms. and temperature of 310° C.–360° C. with recycled hydrogen in the presence of a catalyst for hydrogenating impurities contained in the vapor being treated; introducing fresh coke oven gas into the stream containing recycle hydrogen and benzene to replace the hydrogen consumed; and effecting indirect heat exchange within the catalytic hydrogen reactor, between the fresh coke oven gas that is to be introduced and the recycle hydrogen and benzene stream in the catalyst in the catalytic hydrogenation reactor, before mixture of the two gases; the improvement comprising flowing the fresh coke oven gas at a pressure between 10 and 15 atm. through a catalyst for reduction of nitrogenous compounds during the aforesaid indirect heat exchange of the fresh coke oven gas with the stream containing recycle hydrogen and benzene passing through the hydrogenation catalyst at a pressure of 40–50 atms., to reduce the nitrogenous compounds in the fresh coke oven gas, and thereafter bringing the fresh coke oven gas containing the reduced nitrogenous compounds to the higher working pressure of 40–50 atm. of the stream containing recycle hydrogen and benzene and only thereafter combining the fresh coke oven gas with the stream containing recycle hydrogen and benzene to pass them together through the reactor for hydrogenation as aforesaid at 310° C. to 360° C.

2. A process as claimed in claim 1, characterized by the steps of flowing the fresh coke oven gas through a multi-stage compressor phase for the fresh coke oven gas in which it is first raised to a pressure of not more than 15 atm. aforesaid and removed at said pressure from the compressor and thereupon saturated with steam for conversion of carbon monoxide of the fresh coke oven gas to carbon dioxide and hydrogen, thereafter passing the fresh coke oven gas to the aforesaid catalyst for reduction of nitrogenous compounds while indirect heat exchange within the hydrogenation reactor at said pressure of not more than 15 atm., for effecting said reduction of nitrogenous compounds and completion of the conversion of the carbon monoxide by the steam to carbon monoxide and hydrogen, returning the fresh coke oven gas from the catalyst for reduction of nitrogenous compounds to a higher compressor stage to raise its pressure up to 40–50 atm. for reaction in the hydrogenation catalyst reactor, and thereupon combining the fresh coke oven gas with the stream containing recycle hydrogen and benzene.

References Cited in the file of this patent

UNITED STATES PATENTS

| | | |
|---|---|---|
| 1,967,269 | Smith et al. | July 24, 1934 |
| 2,701,267 | Urban et al. | Feb. 1, 1955 |
| 2,759,799 | Berg | Aug. 21, 1956 |
| 2,827,504 | Schmalenbach | Mar. 18, 1958 |